United States Patent

Harmon et al.

[11] Patent Number: 6,071,568
[45] Date of Patent: Jun. 6, 2000

[54] METHOD FOR IMPROVING APPEARANCE IN COMPOSITE COLOR-PLUS-CLEAR COATINGS AND COMPOSITIONS FOR USE THEREIN

[75] Inventors: Herbert L. Harmon, Southfield; Timothy P. Kandow, Livonia; Gregory G. Menovcik, Farmington Hills, all of Mich.

[73] Assignee: BASF Corporation, Southfield, Mich.

[21] Appl. No.: 09/071,087

[22] Filed: May 1, 1998

[51] Int. Cl.$^7$ .............. B05D 1/36; B05D 3/02; B05D 7/26
[52] U.S. Cl. ............ 427/407.1; 427/409; 427/410; 524/198; 525/131; 525/194; 525/419; 525/452; 525/509; 528/44; 528/368; 560/158
[58] Field of Search ............... 427/409, 410, 427/407.1, 337, 333; 524/198; 525/509, 419, 452, 131, 194; 560/158; 528/44, 368

[56] References Cited

U.S. PATENT DOCUMENTS

| | | | |
|---|---|---|---|
| 3,953,644 | 4/1976 | Camelon et al. | 427/407.1 |
| 5,300,328 | 4/1994 | Rehfuss | 427/388.3 |
| 5,576,063 | 11/1996 | Briggs et al. | 427/386 |
| 5,593,785 | 1/1997 | Mayo et al. | 427/388.3 |
| 5,665,433 | 9/1997 | Moussa et al. | 427/388.3 |
| 5,698,330 | 12/1997 | Bederke et al. | 427/388.3 |
| 5,798,145 | 8/1998 | Barancyk et al. | 427/385.5 |

FOREIGN PATENT DOCUMENTS

| | | |
|---|---|---|
| 0 594 068 A1 | 10/1993 | European Pat. Off. . |
| 0 738 739 A1 | 4/1996 | European Pat. Off. . |
| WO 97/26304 | 7/1997 | European Pat. Off. . |

*Primary Examiner*—Diana Dudash
*Attorney, Agent, or Firm*—Mary E. Golota

[57] ABSTRACT

The invention provides composite color-plus-clear coatings having improved appearance, especially with respect to wrinkling, and to methods and compositions for providing such coatings. The method of the invention utilizes a second coating composition comprising (A) a film forming component comprising (a) a first component comprising a compound having appended thereto at least one carbamate or urea functional group, or a group convertible to a carbamate or urea group, and (b) a second component comprising a compound reactive with said carbamate or urea groups on component (a), (B) a cyclic anhydride, and (C) a catalyst.

27 Claims, No Drawings

METHOD FOR IMPROVING APPEARANCE IN COMPOSITE COLOR-PLUS-CLEAR COATINGS AND COMPOSITIONS FOR USE THEREIN

FIELD OF THE INVENTION

This invention relates to composite color-plus-clear coatings having improved appearance, especially with respect to wrinkling and color, and to methods and compositions for providing such coatings. More particularly, the invention relates to the use of certain acid anhydrides to prevent wrinkling in solvent borne clearcoats used over water borne basecoats, especially anionically stabilized water borne basecoats.

BACKGROUND OF THE INVENTION

Composite color-plus-clear coatings are widely utilized in the coatings art. They are particularly desirable where exceptional gloss, depth of color, distinctness of image, or special metallic effects are required. The automotive industry has made extensive use of color-plus-clear composite coatings for automotive body panels.

As used herein, the term "composite color-plus-clear" relates to composite coating systems requiring the application of a first coating, typically a colored basecoat coating, followed by the application of a second coating, generally a clearcoat, over the noncured or "wet" first coating. The applied first and second coatings are then cured. Thus, such systems are often described as "wet on wet" or "two coat/one bake". Drying processes which fall short of complete cure may be used between the application of the coatings.

Clearcoats used in color-plus-clear systems must have an extremely high degree of clarity in order to achieve the desired visual effects. High gloss coatings also require a low degree of visual aberrations at the surface in order to achieve the desired visual effect such as high distinctness of image (DOI). As a result, clearcoats of color-plus-clear systems are especially susceptible to the phenomenon known as environmental etch, i.e., spots or marks on or in the clear finish that often cannot be rubbed out.

Although many compositions have been proposed for use as the clearcoat of a color-plus-clear composite coating, prior art clearcoat coatings often suffer from disadvantages such as coatability problems, compatibility problems with the colored basecoat, solubility problems, and/or insufficient resistance to environmental etch.

Clearcoat coating compositions exhibiting many advantages over prior art compositions, especially with respect to environmental etch, were disclosed in U.S. Pat. Nos. 5,474,811 and 5,356,669. The disclosed clear coating compositions comprise a first component comprising a polymer backbone having appended thereto at least one carbamate functional group, and a second component comprising a compound having a plurality of functional groups that are reactive with said carbamate groups.

However, regardless of the foregoing improvements, the application of a clear coating composition over a colored basecoat in a wet-on-wet or two coat/one bake system may sometimes result in an undesirable phenomenon known as "wrinkling".

Wrinkling often manifests as one or more small furrows or ridges in the cured clearcoat. Most often, there appears a plurality of furrows, often in areas of low clearcoat film build and high basecoat film build. It is theorized that such imperfections are caused by folding or "wrinkling" of the clearcoat during the curing process.

While not wishing to be bound to a particular theory, it is believed that wrinkling may occur as a result of the presence of or reaction between volatilized amines and acid catalysts. Such a combination can result from the use of a basecoat composition employing waterborne technology, especially anionically stabilized waterborne technology, requiring the use of volatile amines and a solvent borne clearcoat composition utilizing strong acid catalyzed melamine formaldehyde crosslinkers.

Cured color-plus-clear composite coatings exhibiting wrinkling do not possess the required appearance and/or degree of clarity. Composite coatings vulnerable to wrinkling are viewed unfavorably by the automotive industry.

Thus, there is a need for a curable coating composition suitable for use in a color-plus-clear composite coating which possesses desirable curing, performance, and appearance properties but which does not exhibit wrinkling upon cure of the composite coating.

Desirable performance properties in a composite coating are good solvent resistance, hardness and environmental etch resistance. The composite coating and components thereof should also cure at commercially acceptable curing conditions. Advantageous appearance properties in a composite coating and the components thereof are a color resulting solely from the desired pigmentation, high DOI, and a glossy appearance over a wide range of basecoat and clearcoat film thickness.

In particular, it would be advantageous to provide curable coating compositions comprising carbamate functional resins which, when used in a color-plus-clear composite coating, do not exhibit wrinkling upon cure of the composite coating.

Most particularly, it would be desirable to provide clearcoat coating compositions which, when used as the clear in a color-plus-clear composite coating, provide composite coatings having advantageous cure, performance and environmental etch properties as well as improved appearance, such as being substantially free of wrinkling.

Finally, it would be desirable to provide a method for providing substantially wrinkle free color-plus-clear composite systems.

SUMMARY OF THE INVENTION

It is thus an objective of the invention to provide a curable coating composition and a method for using the same to produce color-plus-clear composite coatings which have advantageous performance and appearance properties and which are substantially free of wrinkling upon cure.

More particularly, it is an objective of the invention to provide curable coating compositions comprising a first component which is a compound having appended thereto at least one carbamate or urea functional group, or a group convertible to a carbamate or urea group, and a second component which is a compound reactive with said carbamate or urea groups on component (a), which coating compositions do not exhibit wrinkling when used as the clearcoat in a color-plus-clear composite coating.

It has now been unexpectedly discovered that the foregoing can be achieved with the use of a particular curable coating composition including a film forming component (A) which includes a first component (a) comprising a compound having appended thereto at least one carbamate or urea functional group, or a group convertible to a carbamate or urea group, and a second component (b) comprising a compound reactive with said carbamate or urea groups on component (a), a second component (B) comprising a cyclic anhydride, and a catalyst (C). It has unexpectedly been found that a second coating comprising the combination of (B) and (C) provides a cured composite coating having desirable performance properties and greatly reduced wrinkling.

The method of the invention achieves the foregoing objectives by applying a first coating to a substrate, applying a second coating to the first coating to provide a composite coating, the second coating comprising a film forming component (A) which includes a first component (a) comprising a compound having appended thereto at least one carbamate or urea functional group, or a group convertible to a carbamate or urea group, and a second component (b) comprising a compound reactive with said carbamate or urea groups on component (a), a second component (B) comprising a cyclic anhydride, and a catalyst (C), and subjecting the composite coating to a temperature between 170° F./76.6° C. and 350° F./176.6° C. for a time sufficient to effect cure of the composite coating, wherein the cured composite coating is substantially wrinkle free. More preferably, second component (B) will comprise a cyclic nonaromatic anhydride and most preferably a cyclic anhydride having no unsaturation in either the cyclic anhydride ring or substituents thereto.

DETAILED DESCRIPTION

The present inventions provide a curable coating composition for use in obtaining color-plus-clear composite coatings having improved appearance with respect to wrinkling and color, and a method of providing such cured composite coatings.

The curable coating composition of the invention comprises a film forming component (A), a second component (B) comprising a cyclic anhydride, and a catalyst (C).

The term "film forming component (A)" as used herein refers to the binder or solid material which forms the polymeric film portion of the cured film. Film forming component (A) of the curable coating composition of the invention includes a first component (a) which comprises a compound having appended thereto at least one carbamate or urea functional group, or a group convertible to a carbamate or urea group and a second component (b) comprising a compound reactive with said carbamate or urea groups on component (a).

First component (a) comprises a compound selected from the group consisting of oligomers and polymers having appended thereto more than one carbamate group or more than one urea group, or more than one group convertible to a carbamate or urea group.

Oligomers typically have a molecular weight of between 148 and 2000, the preferred molecular weight for the oligomers is between 900 and 1092; polymers typically have a molecular weight of between 2,000 and 20,000, the preferred molecular weight for the polymers is between 4000 and 6000. Mixtures of said oligomers and polymers may be used as component (A). Molecular weight can be determined by the GPC method using a polystyrene standard. The carbamate or urea content of the polymer, on a molecular weight per equivalent of carbamate or urea functionality, will generally be between 200 and 1200, and preferably between 300 and 800.

Carbamate groups can generally be characterized by the formula

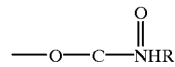

wherein R is H or alkyl, preferably of 1 to 4 carbon atoms. Preferably, R is H or methyl, and more preferably R is H.

Urea groups can generally be characterized by the formula

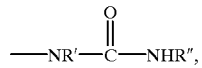

wherein R' and R" each independently represent H or alkyl, preferably of 1 to 4 carbon atoms, or R' and R" may together form a heterocyclic ring structure (e.g. where R' and R" form an ethylene bridge).

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g. 60–150 psi). The temperature for this reaction is preferably 60–150° C. Useful catalysts include any that activate an oxirane ring, such as tertiary amine or quaternary salts (e.g. tetramethyl ammonium bromide), combinations of complex organotin halides and alkyl phosphonium halides (e.g., $((CH)_3SnI$, $BU_4SnI$, $Bu_4PI$, and $(CH_3)_4PI)$, potassium salts (e.g., $K_2CO_3$, KI), preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

Oligomeric compounds useful as first component (a), and having more than one carbamate functional group, have the general formula

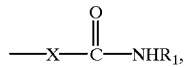

wherein X is O, S or NH, $R_1$ is H or alkyl of 1 to 4 carbon atoms. The compounds useful as oligomeric component (a) according to the invention can be prepared in a variety of ways.

The carbamate can be primary, terminating in an $NH_2$ group, or secondary, terminating in an NHR group. In a preferred embodiment, the carbamate is primary.

One way to prepare oligomeric compounds useful as component (a) is to react an alcohol ('alcohol' is defined herein as having one or more OH groups) with more than one urea to form a compound with carbamate groups. This reaction is accomplished by heating a mixture of the alcohol and ureas. This reaction is also performed under heat, preferably in the presence of a catalyst as is known in the art. Another technique is the reaction of an alcohol with cyanic acid to form a compound with primary carbamate groups (i.e., unsubstituted carbamates). Carbamates may also be prepared by reaction of an alcohol with phosgene and then ammonia to form a compound having primary carbamate groups, or by reaction of an alcohol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*,v. 65, 1965.

Various alcohols can be used in the preparation of carbamate compounds useful as first component (a) according to the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol, 1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Polymeric compounds suitable for use in first component (a) are selected from the group consisting of polyester, epoxy, alkyd, urethane, acrylic, polyamide, and polysilane polymers and mixtures thereof, wherein the polymer has more than one carbamate functional group appended thereto.

In a preferred embodiment, first component (a) comprises a carbamate functional acrylic polymer represented by the randomly repeating units according to the following formula:

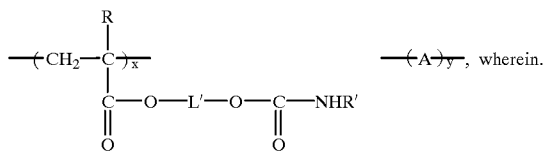

In the above formula, R represents H or $CH_3$. R' represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90% and preferably 20 to 50%, and y being 90 to 10% and preferably 80 to 50%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), vinyl toluene, styrene, styrenic derivatives such as α-methyl styrene, t-butyl styrene, and the like.

L represents a divalent linking group, preferably an aliphatic of 1 to 8 carbon atoms, cycloaliphatic, or aromatic linking group of 6 to 10 carbon atoms. Examples of L include

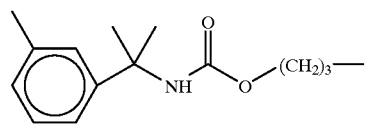

—$(CH_2)$—, —$(CH_2)_2$—, —$(CH_2)_4$—, and the like. In one preferred embodiment, —L— is represented by —COO—L'— where L' is a divalent linking group. Thus, in a preferred embodiment of the invention, polymeric first component (a) is represented by randomly repeating units according to the following formula:

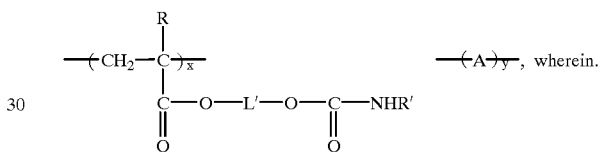

In this formula, R, R', A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. This carbamate functional acrylic polymer is described in U.S. Pat. No. 5,356,669 which is hereby incorporated by reference.

The first component (a) polymer used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an a,b-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing an acrylic polymer for use as component (a) in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing such acrylic polymers involves thermally decomposing urea (to give off ammonia and HNCO) in the presence of a hydroxy-functional acrylic polymer or co-polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to trans-esterify an acrylate polymer with a hydroxyalkyl carbamate.

Groups capable of forming urea groups include amino groups that can be converted to urea groups by reaction with a monoisocyanate (e.g., methyl isocyanate) to form a secondary urea group or with cyanic acid (which may be formed in situ by thermal decomposition of urea) to form a primary urea group. This reaction preferably occurs in the presence of a catalyst as is known in the art. An amino group can also be reacted with phosgene and then ammonia to form a compound having primary urea group(s), or by reaction of an amino group with phosgene and then a primary amine to form a compound having secondary urea groups. Another approach is to react an isocyanate with a hydroxy urea compound to form a urea-capped isocyanate derivative. For example, one isocyanate group on toluene diisocyanate can be reacted with hydroxyethyl ethylene urea, followed by reaction of the other isocyanate group with an excess of polyol to form a hydroxy carbamate.

Second component (b) comprises a compound having functional groups reactive with said carbamate or urea groups on component (a). Suitable reactive groups include active methylol or methylalkoxy groups on aminoplast crosslinking agents or on other compounds such as phenol/formaldehyde adducts, acrylamide groups, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polymers having acrylamide groups, polymers having methylol or alkoxymethyl groups, polyanhydrides (e.g., polysuccinic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. patent application Ser. No. 07/965,510 entitled "Carbamate-Defunctionalized Aminoplast Curing for Polymer Compositions" in the names of John W. Rehfuss and Donald L. St. Aubin.

The curable coating composition of the invention further requires the use of component (B) and catalyst (C). It has unexpectedly been found that the combination of particular component (B) and catalyst (C) provides a second coating, which when used in the method of the invention, results in a cured composite coating having improved appearance, especially with respect to wrinkling, in conjunction with desirable performance properties. This has been found to be the case even the first coating is an anionically stabilized water borne basecoat.

Second component (B) comprises a cyclic anhydride. Cyclic anhydrides which are soluble in one or more alcohols are especially suitable for use as component (B). More preferably, second component (B) will comprise a cyclic nonaromatic anhydride and most preferably, a cyclic anhydride having no unsaturation in either the cyclic anhydride ring or substituents thereto.

Examples of illustrative components (B) are succinic anhydride, glutaric anhydride and methyl hexahydrophthalic anhydride. Succinic anhydride is most preferred in combination with a suitable catalyst (C). As illustrated in the examples, it has been found that anhydrides containing unsaturation in the anhydride ring or substituents thereto, such as phthalic anhydride, do not provide the desired cure or nonwrinkling appearance in conjunction with catalyst (C).

It has been found that second component (B) should be present in amount of from 2.5 to 10.0 percent by weight, based on the total nonvolatile of film forming component (A). Preferably, it has been found that when component (B) is succinic anhydride, (B) should be present in an amount of at least 3% by weight, based on the total nonvolatile of film forming component (A). More preferably, it has been found that when component (B) is succinic anhydride, (B) will be present in an amount of from 3.5 to at least 7% by weight, based on the total nonvolatile of film forming component (A).

Suitable catalysts (C) are those traditional catalysts used to enhance the cure reaction such as strong acid catalysts. Although such catalysts have been known to produce wrinkling, it has been found that the combination of (B) and (C) provides excellent cure without wrinkling.

Suitable catalysts (C) include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Catalyst (C) may be blocked, for example with a suitable amine. Examples of suitable blocked catalysts are Nacure™ 5528 catalyst and Nacure™ 5543 catalyst, both of which are amine blocked dodecylbenzenesulfonic acid, commercially available from King Industries of Norwalk, Conn. A most preferred example of a nonblocked strong acid catalyst is dodecylbenzenesulfonic acid (DDBSA).

A coating composition according to the present invention may be utilized, for example, in the form of substantially solid powder, or a dispersion, and optionally solvent may be utilized in the composition of the present invention. It is often desirable that the composition is in a substantially liquid state, which can be accomplished with the use of a solvent. In general, depending on the solubility characteristics of component (A) and (B), the solvent can be any organic solvent and/or water. In a preferred embodiment, the solvent comprises at least one polar organic solvent. More preferably, the solvent is a polar aliphatic solvent. Still more preferably, the solvent is a ketone, ester, acetate, alcohol, aprotic amide, aprotic sulfoxide, aprotic amine and mixtures thereof. The use of at least one alcohol is especially preferred. Examples of useful solvents include ethanol, isobutanol (iBuOH), methanol (MeOH), propylene carbonate (PC), methyl ethyl ketone, methyl isobutyl ketone, n-amyl acetate, ethylene glycol butyl ether-acetate, propylene glycol monomethyl ether acetate, xylene, n-methylpyrrolidone, blends of aromatic hydrocarbons, and mixtures thereof. Alternatively, the solvent may be water or a mixture of water with small amounts of aqueous co-solvents.

Additional ingredients may be added to the coating composition, such as, but not limited to pigments, rheology control agents, flow control additives, ultraviolet absorbers, and hindered amine light stabilizers.

In a preferred embodiment of the invention, the composition of the invention is utilized as a pigmented coating composition or clearcoat coating composition. In such a composition, the solvent may be present in the composition of the invention in an amount of from about 0.01 weight percent to about 99 weight percent, preferably from about 10 weight percent to about 60 weight percent, and more preferably from about 30 weight percent to about 50 weight percent.

In a particularly preferred embodiment, the composition of the invention is used as a clear and/or colorless coating composition over a pigmented basecoat as part of a composite color-plus-clear coating. Such composite coatings are popular for their depth of color and liquid glossy surface appearance. They have found particularly wide acceptance in the field of automotive coatings. The composition of the invention may also be used as the basecoat of a composite color-plus-clear coating.

The invention further provides a method for providing a composite coating having an improved appearance, especially with respect to wrinkling. The method requires that a first coating be applied to a substrate.

The first coating will generally be a cured composition, such as, a primer, basecoat or clearcoat composition. Preferably, the first coating will be a pigmented basecoat composition, and most preferably a water borne basecoat composition such as is described in U.S. Pat. No. Re. 34,730, hereby incorporated by reference.

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. A preferred polymer is an acrylic polymer.

After the first coating is applied to the substrate, a second coating is applied to the substrate previously coated with the first coating. The second coating is applied directly onto the first coating. Preferably the second coating is applied to the first coating before the first coating is cured. Drying of the first coating short of complete cure may occur. The second coating comprises the coating composition of the instant invention comprising components (A) and (B) discussed above.

Substrates may be plastic, metal, wood and mixtures thereof. Preferred substrates are plastic and metal automotive substrates, especially metal automotive body panels.

Coating compositions can be coated on the article by any of a number of techniques well-known in the art. These include, for example, spray coating, dip coating, roll coating, curtain coating, and the like. For automotive body panels, spray coating is preferred.

After an article is molded, casted, or coated with the above-described layers, the composition is subjected to conditions so as to cure the coating layers. Although various methods of curing may be used, heat-curing is preferred. Generally, heat curing is effected by exposing the coated article to elevated temperatures provided primarily by radiative heat sources.

Curing temperatures will vary depending on the composition of first and second components (a) and (b)used, however they generally range between about 170° F./77° C. and 395° F./201° C., preferably between 200° F./93° C. and 350° F./177° C., and most preferably between 250° F./121° C. and 286° F./141° C. The curing time will vary depending on the particular components used and physical parameters such as the thickness of the layers, however, typical curing times range from 15 to 60 minutes.

The invention is further described in the following non-limiting examples.

EXAMPLE 1

Clearcoat compositions A–C were prepared according to the following formulations. Composition A was the DDBSA control. All measurements are in grams unless otherwise specified.

TABLE 1

| Material | Composition A | Composition B | Composition C |
|---|---|---|---|
| Resin[1] | 150.2 | 150.0 | 151.7 |
| DDBSA | 5.2 | 5.2 | 5.2 |
| Melamine[2] | 18.0 | 17.9 | 18.5 |
| Succinic Anhydride[3] | — | 8.0 | — |
| Phthalic Anhydride[4] | — | — | 5.0 |
| NMP | 12.4 | 12.4 | 12.4 |
| amyl acetate | 16.1 | 16.1 | 16.1 |
| isobutanol | 6.3 | 6.3 | 6.3 |
| Propylene Carbonate | 17.2 | 17.2 | 17.2 |

[1]The resin was a carbamate functional acrylic prepared in accordance with U.S. Pat. No. 5,356,669, incorporated herein.
[2]The melamine used was a monomeric methylated melamine.
[3]The succinic anhydride was in the form of a 50% solution of the anhydride prepared in propylene carbamate.
[4]The phthalic anhydride is in the form of a 25% solution of phthalic anhydride prepared in a 50/50 blend of acetone and propylene carbamate.

A water borne silver metallic anionically stabilized polyester based basecoat was sprayed onto 12"x18" electro-coated steel panels (APR17438) from ACT of Hillsdale, Mich. The basecoat and clearcoat samples were applied in a wedge, that is, the basecoat film build varied from 0.2 mil at the top of the panel to 0.7 mil at the bottom of the panel. The clearcoat film build varied from 1.0 mil (left side of panel) to 2.0 mil (right side of panel).

[1] The resin was a carbamate functional acrylic prepared in accordance with U.S. Pat. No. 5,356,669, incorporated herein.
[2] The melamine used was a monomeric methylated melamine.
[3] The succinic anhydride was in the form of a 50% solution of the anhydride prepared in propylene carbamate.
[4] The phthalic anhydride is in the form of a 25% solution of phthalic anhydride prepared in a 50/50 blend of acetone and propylene carbamate.

The basecoat was dried for 5 minutes at 120° F., followed by application of a clearcoat sample. The clearcoats were flashed for 5 minutes at ambient and baked for 20 minutes at 270° F.

All samples were clear in color. Both samples B and C passed an MEK soak test and had over 200 rubs on the MEK double rub test. Sample B, (succinic anhydride) did not show any wrinkling, while sample C (phthalic anhydride) did wrinkle. Although poor cure was observed on one edge of the sample B panel, it is believed that this is due to a cold spot in the oven.

EXAMPLE 2

An experiment to determine the correct amount of component (B) was conducted. Varying levels of succinic anhydride were added to URECLEAR® clearcoat, a commercially available solvent borne carbamated acrylic/melamine based clearcoat sold by BASF Corporation, Southfield, Mich. The % succinic anhydride was based on the total nonvolatile of film forming component (A).

Sample panels were prepared as in Example 1.

TABLE 2

| % Succinic Anydride | % Wrinkle | Tukon Hardness[5] Clearcoat | Tukon Hardness Composite Coating |
| --- | --- | --- | --- |
| 0% | 75 | 6.8 | 4.5 |
| 0.9% | 75 | 9.1 | 4.3 |
| 1.7% | 25 | 7.8 | 4.1 |
| 3.5% | ≈5 | 7.9 | 2.9 |
| 7.0% | 0 | 8.4 | 2.2 |

[5]Tukon Hardness in Knoops according to ASTM D1474.

The results indicated that the presence of at least 1.0 to 2.0 percent succinic anhydride produced significant reduction in wrinkling in a solvent borne clearcoat applied over a water borne anionically stabilized basecoat.

EXAMPLE 3

The effect of certain cyclic anhydrides with blocked acids was investigated. A first sample (A) was prepared by combining about 300 grams of the resin used in Example 1, about 35 grams of the melamine used in Example 1 and about 10.5 grams of Nacure™ 5528 catalyst[6]. Approximately 80 to 100 grams of the solvent blend used in Example 1 was also added.

A second sample (B) was similarly prepared but about 10.5 grams of Nacure™ 5543 catalyst[7] was used in place of the Nacure™ 5528 catalyst.

Sample A was divided into 3 equal samples, A1, A2, and A3. Sample B was divided into 3 equal samples, B1, B2, and B3. Four samples, (A1, A2, B1, and B2) were used to make the following compositions.

TABLE 3

| | C1 | C2 | C3 | C4 |
| --- | --- | --- | --- | --- |
| A1 | 100 | | | |
| A2 | | 100 | | |
| B1 | | | 100 | |
| B2 | | | | 100 |
| Succinic Anhydride | — | 7% | — | 7% |

Sample panels were prepared according to the manner of Example 1, except that APR26073 10"×10" steel panels from ACT of Hillsdale, Mich. were used.

The results are set forth below in Table 4.

[7] An amine blocked DDBSA in isopropanol commercially available from King Industries of Norwalk, Conn.

TABLE 4

| Sample | Clearcoat Tukon | Basecoat Tukon | Wrinkle | Yellowing |
| --- | --- | --- | --- | --- |
| C1 | 7.67 | 6.5 | YES | NO |
| C2 | 9.33 | 8.65 | NO | NO |
| C3 | 8.11 | 8 | YES | NO |
| C4 | 7.7 | 6.9 | NO | NO |

The samples according to the invention did not wrinkle.

EXAMPLE 4

The effect of hexahydromethylphthalic anhydride (HHMPA) on wrinkling was investigated. About 11 grams of DDBSA and 31.1 grams of HHMPA were added to approximately 500 of URECLEAR® clearcoat made without catalyst. URECLEAR® clearcoat is a commercially available solvent borne carbamated acrylic/melamine based clearcoat sold by BASF Corporation, Southfield, Mich. The sample was reduced to about 32 seconds on a #4 Ford viscosity cup using a 1:1 blend of oxo-hexyl acetate and methyl isoamyl ketone.

A sample panel was prepared according to the manner of Example 1. No wrinkling was observed.

What is claimed is:

1. A method for providing a composite coating having an improved appearance, comprising:
    applying a first coating to a substrate;
    applying a second coating to the first coating to provide a composite coating, the second coating comprising,
        (A) a film forming component comprising
            (a) a first component comprising a compound having appended thereto at least one carbamate or urea functional group, or a group convertible to a carbamate or urea group, and
            (b) a second component comprising a compound reactive with said carbamate or urea groups on component (a),
        (B) a cyclic anhydride having no unsaturation in either the cylic anhydride ring or substituents thereto, and
        (C) a catalyst, and
    subjecting the composite coating to a temperature between about 170° F./77° C. to 350° F./177° C. for a time sufficient to provide a cured composite coating, the cured composite coating having an improved appearance relative to a composite coating having a second coating free of component (B).
2. The method of claim 1 wherein the cured composite coating is substantially wrinkle free.
3. The method of claim 1 wherein first component (a) comprises a compound selected from the group consisting of oligomers having appended thereto more than one functional group selected from the group consisting of carbamate groups, urea groups and groups converted to carbamate or urea groups, said oligomers having a molecular weight of between 148 and 2000, polymers having appended thereto more than one functional group selected from the group consisting of carbamate groups, urea groups and functional groups convertible to carbamate or urea groups, said polymers having a molecular weight of greater than 2000, and mixtures of said polymers and oligomers.
4. The method of claim 1 wherein said first component (a) comprises a carbamate or urea functional polymer selected from the group consisting of polyester, epoxy, alkyd, urethane, acrylic, polyamide and polysilane polymers and mixtures thereof.

5. The method of claim 3 wherein first component (a) comprises a polymer backbone having appended thereto more than one carbamate functional group, said first component being represented by randomly repeating units according the formula:

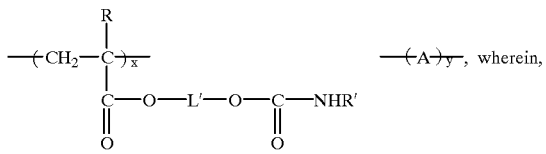

R represents H or CH$_3$,
R' represents H, alkyl, or cycloalkyl,
L represents a divalent linking group,
A represents repeat units derived from one or more ethylenically unsaturated monomers,
x represents 10 to 90 weight %, and
y represents 90 to 10 weight %.

6. The method of claim 5 wherein A represents repeat units derived from more than one ethylenically unsaturated monomers, more than one monomer having appended thereto a carbamate group.

7. The method of claim 5, wherein A represents repeat units derived from one or more ethylenically unsaturated monomer, said ethylenically unsaturated monomers comprising one or more acrylic monomers.

8. The method of claim 7 wherein 10–90% by weight of said ethylenically unsaturated monomers are acrylic monomers.

9. The method of claim 5 wherein —L— is represented by the formula —COO—L', where L' is a divalent linking group.

10. The method of claim 1 wherein first component (a) comprises an oligomer having appended thereto more than one functional group selected from the group consisting of carbamate groups, urea groups, and groups subsequently converted to carbamate or urea groups, said oligomer having a molecular weight of between 148 and 2000.

11. The method of claim 1, wherein
second component (b) comprises a compound selected from the group consisting of melamine formaldehyde resins, urea resins, polymers having acrylamide groups, polymers having methylol or alkoxymethyl groups, polyanhydrides and polysiloxanes.

12. The method of claim 11, wherein second component (b) comprises a compound selected from the group consisting of melamine formaldehyde resins and urea resins.

13. The method of claim 1, wherein the cyclic anhydride is selected from the group consisting of succinic anhydride, glutaric anhydride, methyl hexahydrophthalic anhydride and mixtures thereof.

14. The method of claim 13, wherein the cyclic anhydride is succinic anhydride.

15. The method of claim 13, wherein the cyclic anhydride is methyl hexahydrophthalic anhydride.

16. The method of claim 14, wherein the second coating comprises at least 2% by weight of succinic anhydride, based on the nonvolatile portion of film forming component (A).

17. The method of claim 1, wherein the second coating further comprises
(C) one or more solvents,
(D) additives, and
(E) optionally, pigments.

18. The method of claim 1 wherein the first coating is a pigment containing basecoat.

19. The method of claim 18 wherein the first coating is a water borne pigment containing basecoat.

20. The method of claim 1 wherein the second coating is a solvent borne coating.

21. The method of claim 20 wherein the second coating is clearcoat.

22. The method of claim 1 wherein the second coating further comprises dodecylbenzenesulfonic acid as catalyst (C).

23. The method of claim 1 comprising subjecting the composite coating to a temperature between 220° F./104.4° C. and 300° F./148.9° C.

24. The method of claim 23 comprising subjecting the composite-coating to a temperature between 240° F./115.6° C. and 280° F./137.8° C. for a time between 18 to 25 minutes.

25. The method of claim 1 wherein the first coating is not cured prior to the application of the second coating.

26. A method for providing a composite coating comprising:
applying a first coating to a substrate;
applying a second coating to the first coating to provide a composite coating, the second coating comprising,
(A) a film forming component comprising
(a) a first component comprising a compound having appended thereto at least one carbamate or urea functional group, or a group convertible to a carbamate or urea group, and
(b) a second component comprising a compound reactive with said carbamate or urea groups on component (a),
(B) a cyclic anhydride having no unsaturation in either the cylic anhydride ring or substituents thereto, and
(C) a catalyst, and
subjecting the composite coating to a temperature between about 170° F./77° C. to 350° F./177° C. for a time sufficient to provide a cured composite coating.

27. A curable coating composition comprising,
(A) a film forming component comprising
(a) a first component comprising a compound having appended thereto at least one carbamate or urea functional group, or a group convertible to a carbamate or urea group, and
(b) a second component comprising a compound reactive with said carbamate or urea groups on component (a), and
(B) a cyclic anhydride having no unsaturation in either the cylic anhydride ring or substituents thereto, and
(C) a catalyst.

* * * * *